United States Patent
Hikari et al.

(10) Patent No.: US 8,175,023 B2
(45) Date of Patent: May 8, 2012

(54) RADIOCOMMUNICATION SYSTEM AND MULTICAST DATA DISTRIBUTION METHOD IN THE RADIOCOMMUNICATION SYSTEM

(75) Inventors: Masafumi Hikari, Yokohama (JP); Yoshimi Saito, Yokohama (JP); Shinji Matsumoto, Yokohama (JP); Jun Asaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 454 days.

(21) Appl. No.: 12/521,146

(22) PCT Filed: Jan. 25, 2007

(86) PCT No.: PCT/JP2007/051176
§ 371 (c)(1),
(2), (4) Date: Aug. 13, 2009

(87) PCT Pub. No.: WO2008/090618
PCT Pub. Date: Jul. 31, 2008

(65) Prior Publication Data
US 2010/0039977 A1 Feb. 18, 2010

(51) Int. Cl.
*H04H 20/71* (2008.01)
(52) U.S. Cl. ........ 370/312; 370/351; 370/389; 370/390; 370/431; 370/432; 455/39; 455/68; 455/69
(58) Field of Classification Search .................. 370/312, 370/390, 432; 455/68–69
See application file for complete search history.

(56) References Cited

U.S. PATENT DOCUMENTS

| 2004/0121788 A1 | 6/2004 | Moon et al. |
| 2006/0052067 A1* | 3/2006 | Singh et al. ................... 455/108 |
| 2006/0087994 A1 | 4/2006 | Barth et al. |

FOREIGN PATENT DOCUMENTS

| CN | 1497990 A | 5/2004 |
| JP | 11-242588 A | 9/1999 |
| JP | 2002-44134 A | 2/2002 |
| JP | 2003-37606 A | 2/2003 |

(Continued)

OTHER PUBLICATIONS

J. Han et al., Multiple OFDM formats for EBM packet transmission, Samsung Electronics, C30-20050620-009, Jun. 20, 2005.

(Continued)

*Primary Examiner* — Hassan Kizou
*Assistant Examiner* — Charles C Jiang
(74) *Attorney, Agent, or Firm* — Mattingly & Malur, PC

(57) ABSTRACT

Radio resources are utilized efficiently and the communication quality is improved by flexibly adapting to the state of radio waves at a base station varying every moment or the topology of the distribution area of contents in multicast communication. The base station (100) stores information including the flow distribution starting time, the error rate measuring period, the threshold in an intra-base station flow management table. When detecting that it becomes the time before the error rate measuring period from the flow distribution starting time, the reception quality of radio terminals in the communication area of the base station (100) is measured. A base station (100-*b*) where the reception quality exceeds the threshold redundantly transmits multicast data assigned to a plurality of radio resources (800-*b1*, 800-*b3*, 800-*b5*). A base station (100-*a*) where the reception quality does not exceed the threshold transmits multicast data assigned to a single radio resource (800-*a1*).

20 Claims, 13 Drawing Sheets

FOREIGN PATENT DOCUMENTS

| | | |
|---|---|---|
| JP | 2003-78563 A | 3/2003 |
| JP | 2004-17679 A | 6/2004 |
| JP | 2005-33548 A | 2/2005 |
| JP | 2005-101730 A | 4/2005 |
| JP | 2006-135956 A | 5/2006 |

OTHER PUBLICATIONS

3GPP2 C.S0054-A v1.0, Broadcast Protocol Suite, pp. 2-59 to 2-60.

3GGP2 C.S0029-A v1.0, Broadcast Test Application Protocol (BTAP) Specification, pp. 6-1 to 6-12.

* cited by examiner

| FLOW ID | DISTRIBUTION BEGINNING TIME INSTANT 306-1 | DISTRIBUTION END TIME INSTANT 306-2 | OBJECT-OF-FLOW DISTRIBUTION BASE STATION 306-4 | ERROR RATE MEASUREMENT TIME 306-5 | TRANSMISSION MODE SWITCHING THRESHOLD 306-6 | PACKET ERROR RATE 306-7 | OPERATING TRANSMISSION MODE 306-8 |
|---|---|---|---|---|---|---|---|
| 0001 | 2006/03/28 10:00 | 2006/03/28 10:20 | BASE STATION A | 5min | 1.0 | 2.5 | REDUNDANT TRANSMISSION MODE |
| | | | BASE STATION B | 5min | 1.0 | 0.5 | NORMAL TRANSMISSION MODE |
| | | | BASE STATION C | 5min | 1.0 | 1.4 | REDUNDANT TRANSMISSION MODE |
| 0002 | 2006/03/28 14:00 | 2006/03/28 15:00 | BASE STATION A | 5min | 1.0 | 2.1 | REDUNDANT TRANSMISSION MODE |
| | | | BASE STATION D | 5min | 1.0 | 0.9 | NORMAL TRANSMISSION MODE |
| .. | .. | .. | .. | .. | .. | .. | .. |

FIG.3

| FLOW ID | DISTRIBUTION BEGINNING TIME INSTANT | DISTRIBUTION END TIME INSTANT | ERROR RATE MEASUREMENT TIME | TRANSMISSION MODE SWITCHING THRESHOLD | PACKET ERROR RATE | OPERATING TRANSMISSION MODE |
|---|---|---|---|---|---|---|
| 0001 | 2006/03/28 10:00 | 2006/03/28 10:20 | 5min | 1.0 | 2.5 | REDUNDANT TRANSMISSION MODE |
| 0002 | 2006/03/28 14:00 | 2006/03/28 15:00 | 5min | 1.0 | 2.1 | REDUNDANT TRANSMISSION MODE |
| .. | .. | .. | .. | .. | .. | .. |

FIG.6

| FLOW ID | DISTRIBUTION BEGINNING TIME INSTANT 306-1' | DISTRIBUTION END TIME INSTANT 306-2' | OBJECT-OF-FLOW DISTRIBUTION BASE STATION 306-3' | ERROR RATE MEASUREMENT TIME 306-4' | TRANSMISSION MODE SWITCHING THRESHOLD 306-5' | PACKET ERROR RATE 306-6' | OPERATING TRANSMISSION MODE 306-7' | ERROR RATE MEASUREMENT HIERARCHY 306-8' 306-9' |
|---|---|---|---|---|---|---|---|---|
| 0001 (FLOW A) | 2006/03/28 10:00 | 2006/03/28 10:20 | BASE STATION D | 5min | 1.0 | 2.5 | REDUNDANT TRANSMISSION MODE | 3 |
|  |  |  | BASE STATION C | 5min | 1.0 | 0.5 | NORMAL TRANSMISSION MODE |  |
|  |  |  | BASE STATION B | 5min | 1.0 | 1.5 | REDUNDANT TRANSMISSION MODE |  |
|  |  |  | BASE STATION A | 0min | - | - | NORMAL TRANSMISSION MODE |  |
|  |  |  | ⋮ | ⋮ | ⋮ | ⋮ | ⋮ |  |
| 0002 (FLOW B) | 2006/03/28 8:00 | 2006/03/28 12:00 | BASE STATION E | 5min | 1.0 | 2.1 | REDUNDANT TRANSMISSION MODE | 3 |
|  | ⋮ | ⋮ |  |  |  |  |  | ⋮ |

FIG.11

| BASE STATION | ADJACENT BASE STATION | |
|---|---|---|
| BASE STATION A | BASE STATION B | ⎯2100 |
| | : | |
| BASE STATION B | BASE STATION A | |
| | BASE STATION C | |
| | : | |
| BASE STATION C | BASE STATION B | |
| | BASE STATION D | |
| | : | |
| BASE STATION D | BASE STATION C | |
| | BASE STATION E | |
| | : | |
| BASE STATION E | BASE STATION D | |
| | : | |
| : | : | |

FIG.12

RADIOCOMMUNICATION SYSTEM AND MULTICAST DATA DISTRIBUTION METHOD IN THE RADIOCOMMUNICATION SYSTEM

FIELD OF THE INVENTION

The present invention relates to a radiocommunication system and a multicast data distribution method in the radiocommunication system. More particularly, the present invention is concerned with a radiocommunication system and a multicast data distribution method in the radiocommunication system in relation to a multicast data distribution technology in the radiocommunication system and a control technology for apparatuses in multicast data distribution.

BACKGROUND OF THE INVENTION

In recent years, a larger volume of sounds and a larger amount of data have come to be transmitted or received through radiocommunication. In a radiocommunication system, as far as point-to-point unicast communication is concerned, a different radio band is assigned to each wireless terminal and a connection is established by radio in order to perform communication. In contrast, in the case of multicast communication for distributing one content of sounds and data to multiple wireless terminals, a specific band within a radio band is assigned as a multicast resource. A wireless base station transmits a multicast content of sounds and data in the specific band. The content transmitted by way of the multicast resource is selectively received and decoded by a plurality of terminals. Thus, a multicast content distribution service addressed to the plurality of terminals is realized. When multicast communication is realized in this way, once data is transmitted in the specific band, the same data can be transmitted to the plurality of wireless terminals. Therefore, the radio band can be efficiently utilized.

As literatures concerning multicast communication, for example, Non-patent document 1 is available. In Non-patent document 1, for example, a packet format for multicast communication is stipulated. Non-patent document 2 stipulates a test application protocol for radiocommunication. Although Non-patent document 2 does not stipulate multicast communication, since Non-patent document 2 specifies a technology associated to the present invention, Non-patent document 2 is cited therein.

Non-patent document 1: 3GPP2 C.S0054-A (2.4.7.4.1.7.2)
Non-patent document 2: 3GPP2 C.S0029-A (Section 6)
Non-patent document 3: "Multiple OFDM Formats for EBM Packet Transmission," C30-20050620-009

DISCLOSURE OF INVENTION

Problems to be Solved

If the state of a radio wave to be received by a wireless terminal is changed or the radio data receiving quality of the wireless terminal is degraded due to factors such as interference, a user may not normally view distributed data.

In the case of point-to-point unicast communication, a different radio band is assigned to each wireless terminal and a connection is established by radio in order to perform communication. Therefore, means for performing communication according to receiving quality is prepared for a base station and wireless terminals. However, in multicast communication, data is uni-directionally transmitted. There is difficulty in meticulously performing distribution in consideration of the receiving states of the respective wireless terminals. In the multicast communication, when a base station in a specific area is selected in order to distribute a multicast flow, degradation in communication quality is markedly manifested in a cell, which is located on the border of the distribution area, due to interference with a flow to be distributed in an adjacent cell. The multicast flow means a unit of multicast data having a meaning. For example, one multicast flow corresponds to one multicast content (program).

Each wireless terminal or each user unconsciously utilizes a service in a unicast mode and a service in a multicast mode. Therefore, even in the multicast mode, a service of quality equal to the quality offered in the unicast mode is requested to be provided.

In view of the above, an object of the present invention is to provide a radiocommunication system and a multicast data distribution method in the radiocommunication system for meticulously performing distribution in consideration of the receiving states of respective wireless terminals even through multicast communication while flexibly coping with the radio-wave state of a base station that changes all the time, or a topology in a content distribution area. Another object of the present invention is to provide a radiocommunication system and a multicast data distribution method in the radiocommunication system capable of efficiently utilizing radio resources and improving communication quality.

An object of the present invention is to provide a radiocommunication system that when a content is distributed to wireless terminals through multicast, estimates the signal propagating state of a wireless base station, identifies a base state whose communication quality is predicted to be degraded, and autonomously selects and executes communication to be performed with the error resistibility of the base station intensified.

An object of the present invention is to efficiently utilize a radio resource by measuring a packet error rate at a base station in a distribution area, allowing a base station, at which the packet error rate is larger than a threshold, to redundantly transmit a multicast flow, and allowing a base station, at which the packet error rate is equal to or smaller than the threshold, to transmit the multicast flow normally. Another object of the present invention is to avoid wasting of a radio resource, which results from error rate measurement, at a base station, which does not carry out the measurement, by determining the border of a flow distribution area and confining a base station, which carries out the error rate measurement, to a border area.

Means to Solve the Problems

In order to solve the foregoing problem, according to the present invention, a base station management apparatus is provided with a flow management table, in which at least a distribution beginning time instant and an object-of-distribution base station are stored in association with each multicast flow in order to manage transmission of multicast flows. The base station management apparatus transmits information on designation of distribution booking of a multicast flow stored in the flow management table as, for example, a flow booking message to object-of-flow distribution base stations. Each of the base stations receives the flow booking message and stores information contained in the flow booking message in an intra-base station flow management table in a base station control unit thereof. When detecting that a flow distribution beginning time instant stored in the intra-base station flow management table has come, the base station transmits a protocol (or a packet), which is used to measure receiving quality and return the result of the measurement to the base station, to wireless terminals in the communication area of the base station, and measures the receiving qualities in the communication area, and switches multicast flow transmission methods on the basis of the results of the measurement.

The base station management apparatus may include an adjacent base station management table in which the relationships of adjacency among base stations are stored. The flow management table and adjacent base station management table are referenced in order to extract base stations in a border area relative to a distribution area of a different multicast flow. Based on the results of the extraction, the receiving qualities in a communication area of a specific base station are measured in order to control a multicast flow transmission method.

The present invention is concerned with a radiocommunication system including, for example, multiple wireless terminals, multiple base stations that communicate with the multiple wireless terminals, and a base station management apparatus that is connected to the multiple base stations and manages the multiple base stations, and a multicast data distribution method in the radiocommunication system. The present invention is characterized in that:

the base station management apparatus includes a line interface that accommodates connection lines led to the base stations, a control unit, and a flow management table in which at least a distribution beginning time instant and an object-of-distribution base station are stored in association with each multicast flow in order to manage transmission of multicast flows;

each of the base stations includes a line interface that accommodates a connection line led to the base station management apparatus, a base station control unit that controls the base station, and a signal processing unit and an antenna for use in communicating with the wireless terminals;

the information on designation of distribution booking of a multicast flow, which is entered in the flow management table in the base station management apparatus, is transmitted as a flow booking message to the object-of-flow distribution base stations under the control of the control unit in the base station management apparatus;

each of the base stations receives the flow booking message, and stores information, which is contained in the flow booking message, in an intra-base station flow management table in the base station control unit; and when detecting that a flow beginning time instant stored in the intra-base station flow management table has come, the base station control unit transmits a protocol, which is used to measure receiving qualities and return the results of the measurement to the base station, to wireless terminals in the communication area of the base station, measures the receiving qualities in the communication area, and switches multicast flow transmission methods on the basis of the results of the measurement.

The present invention is characterized in that, for example, a test application protocol is used as the protocol that is used to measure receiving qualities and return the results of the measurement to a base station and that is transmitted from the base station to wireless terminals in the communication area of the base station.

The present invention is characterized in that: for example, when the results of measurements of receiving qualities demonstrate that the receiving quality is lower than a predetermined threshold, a redundant transmission mode in which multiple radio resources are assigned to transmission of a multicast flow is adopted for transmission; and when the receiving quality is equal to or higher than the predetermined threshold, a normal transmission mode in which one radio resource is assigned to transmission of the multicast flow is adopted for transmission.

The present invention is concerned with a radiocommunication system including, for example, multiple wireless terminals, multiple base stations that communicate with the multiple wireless terminals, and a base station management apparatus that is connected to the multiple base stations and manages the multiple base stations, and a multicast data distribution method in the radiocommunication system. The present invention is characterized in that:

the base station management apparatus includes a line interface that accommodates connection lines led to the base stations, a control unit, and a flow management table in which at least a distribution beginning time instant and an object-of-distribution base station are stored in association with each multicast flow in order to manage transmission of multicast flows;

each of the base stations includes a line interface that accommodates a connection line led to the base station management apparatus, a base station control unit that controls the base station, and a signal processing unit and an antenna for use in communicating with the wireless terminals;

information on designation of distribution booking of a multicast flow entered in the flow management table in the base station management apparatus is transmitted as a flow booking message to object-of-flow distribution base stations under the control of the control unit in the base station management apparatus;

each of the base stations receives the flow booking message, and stores information, which is contained in the flow booking message, in an intra-base station flow management table in the base station control unit;

the base station management apparatus further includes an adjacent base station management table in which the relationships of adjacency among the base stations are stored; and the control unit in the base station management apparatus references the flow management table and adjacent base station management table so as to extract base stations in a border area relative to a distribution area of a different multicast flow, and controls a multicast flow transmission method on the basis of the results of the extraction.

The present invention is characterized in that: for example, the border area is classified into any of multiple hierarchies according to a distance on the basis of the results of extraction of base stations in the border area; and a multicast flow transmission method in a base station is controlled based on whether the area of the base station is classified into any of the multiple hierarchies.

According to the first solving means of this invention, there is provided a radiocommunication system that comprises a plurality of base stations which communicates with wireless terminals, and a base station management apparatus which is connected to the plurality of base stations and manages the plurality of base stations, and that transmits a multicast flow, of which distribution time instant and distribution area are predetermined, to the wireless terminals, wherein:

the base station management apparatus includes
a first line interface that accommodates connection lines led to the plurality of base stations,
a first control unit that controls the own apparatus, and
a first flow management table in which at least a distribution beginning time instant and an identifier or identifiers of one or a plurality of object-of-distribution base stations existing in the distribution area are stored in association with an identifier of each multicast flow, and
wherein each of the plurality of base stations includes a second line interface that accommodates connection lines led to the base station management apparatus and a network, a second control unit that controls the own base station, a signal processing unit and an antenna for use in communicating with the wireless terminals by radio, and a second flow management table in which at least the distribution beginning time instant is stored in association with the identifier of each multicast flow;

wherein the first control unit in the base station management apparatus transmits the identifier of the multicast flow and the distribution beginning time instant, which are stored in the first flow management table, to the base station, which is an object of distribution, according to the identifier of the object-of-distribution base station;

the second control unit in the base station stores in the second flow management table the identifier of the multicast flow and the distribution beginning time instant received via the second interface;

when a current time instant has come to a time instant that is earlier by a predetermined time than the distribution beginning time instant stored in the second flow management table, the second control unit in the base station transmits a protocol or a packet, which is used to measure receiving quality, to the wireless terminals in the communication area of the own base station through the antenna, and measures the receiving qualities of the wireless terminals in the communication area;

if it is found based on the results of the measurements of the receiving qualities that any receiving quality does not satisfy a predetermined criterion, the second control unit in the base station designates a redundant transmission mode in which a plurality of radio resources is assigned to transmission of one multicast flow;

if the receiving quality satisfies the criterion, the second control unit in the base station designates a normal transmission mode in which one radio resource is assigned to transmission of one multicast flow; and the second control unit in the base station transmits a multicast flow, which is received from the network via the second interface, to the wireless terminals in the designated transmission mode.

According to the second solving means of this invention, there is provided A multicast data distribution method in a radiocommunication system that comprises a plurality of base stations which communicates with wireless terminals, and a base station management apparatus which is connected to the plurality of base stations and manages the plurality of base stations, for transmitting a multicast flow, of which distribution time instant and distribution area are predetermined, to the wireless terminals, including:

the base station management apparatus transmits an identifier of the multicast flow and a distribution beginning time instant, which are stored in a first flow management table in which at least the distribution beginning time instant and an identifier or identifiers of one or a plurality of object-of-distribution base stations existing in the distribution area are stored in association with the identifier of each multicast flow, to the base station which is an object of distribution according to the identifier of the object-of-distribution base station;

the base station stores the identifier of the multicast flow and the distribution beginning time instant received via the second interface in a second flow management table, in which at least the distribution beginning time instant is stored in association with the identifier of each multicast flow, of the base station;

when a current time instant has come to a time instant that is earlier by a predetermined time than the distribution beginning time instant stored in the second flow management table, the second control unit in the base station transmits a protocol or a packet, which is used to measure receiving quality, to the wireless terminals in the communication area of the own base station through the antenna, and measures the receiving qualities of the wireless terminals in the communication area;

if it is found based on the results of the measurements of the receiving qualities that any receiving quality does not satisfy a predetermined criterion, the second control unit in the base station designates a redundant transmission mode in which a plurality of radio resources is assigned to transmission of one multicast flow;

if the receiving quality satisfies the criterion, the second control unit in the base station designates a normal transmission mode in which one radio resource is assigned to transmission of one multicast flow; and the second control unit in the base station transmits a multicast flow, which is received from the network, to the wireless terminals in the designated transmission mode.

Advantage

According to the present invention, it is possible to meticulously performs distribution in consideration of the receiving states of respective wireless terminals even through multicast communication while flexibly coping with the radio-wave state of a base station that changes all the time, or a topology in a content distribution area. According to the present invention, it is possible to provide a radiocommunication system and so on capable of efficiently utilizing radio resources and improving communication quality.

According to the present invention, it is possible to provide a radiocommunication system that when a content is distributed to wireless terminals through multicast, estimates the signal propagating state of a wireless base station, identifies a base state whose communication quality is predicted to be degraded, and autonomously selects and executes communication to be performed with the error resistibility of the base station intensified.

According to the present invention, it is possible to efficiently utilize a radio resource by measuring a packet error rate at a base station in a distribution area, allowing a base station, at which the packet error rate is larger than a threshold, to redundantly transmit a multicast flow, and allowing a base station, at which the packet error rate is equal to or smaller than the threshold, to transmit the multicast flow normally. According to the present invention, it is possible to avoid wasting of a radio resource, which results from error rate measurement, at a base station, which does not carry out the measurement, by determining the border of a flow distribution area and confining a base station, which carries out the error rate measurement, to a border area.

BRIEF DESCRIPTION OF THE DRAWINGS

FIG. 3 is a diagram showing an example of the construction of a flow management table preserved in a base station management apparatus in the embodiment of the present invention;

FIG. 6 is a diagram showing an example of the construction of an intra-base station flow management table preserved in the base station in the embodiment of the present invention;

FIG. 11 is a diagram showing an example of the construction of a flow management table preserved in a base station management apparatus in another embodiment of the present invention;

FIG. 12 is a diagram showing an example of the construction of an adjacent base station management table in relation to the topology shown in FIG. 10.

EMBODIMENT OF THE INVENTION

Figure 1:
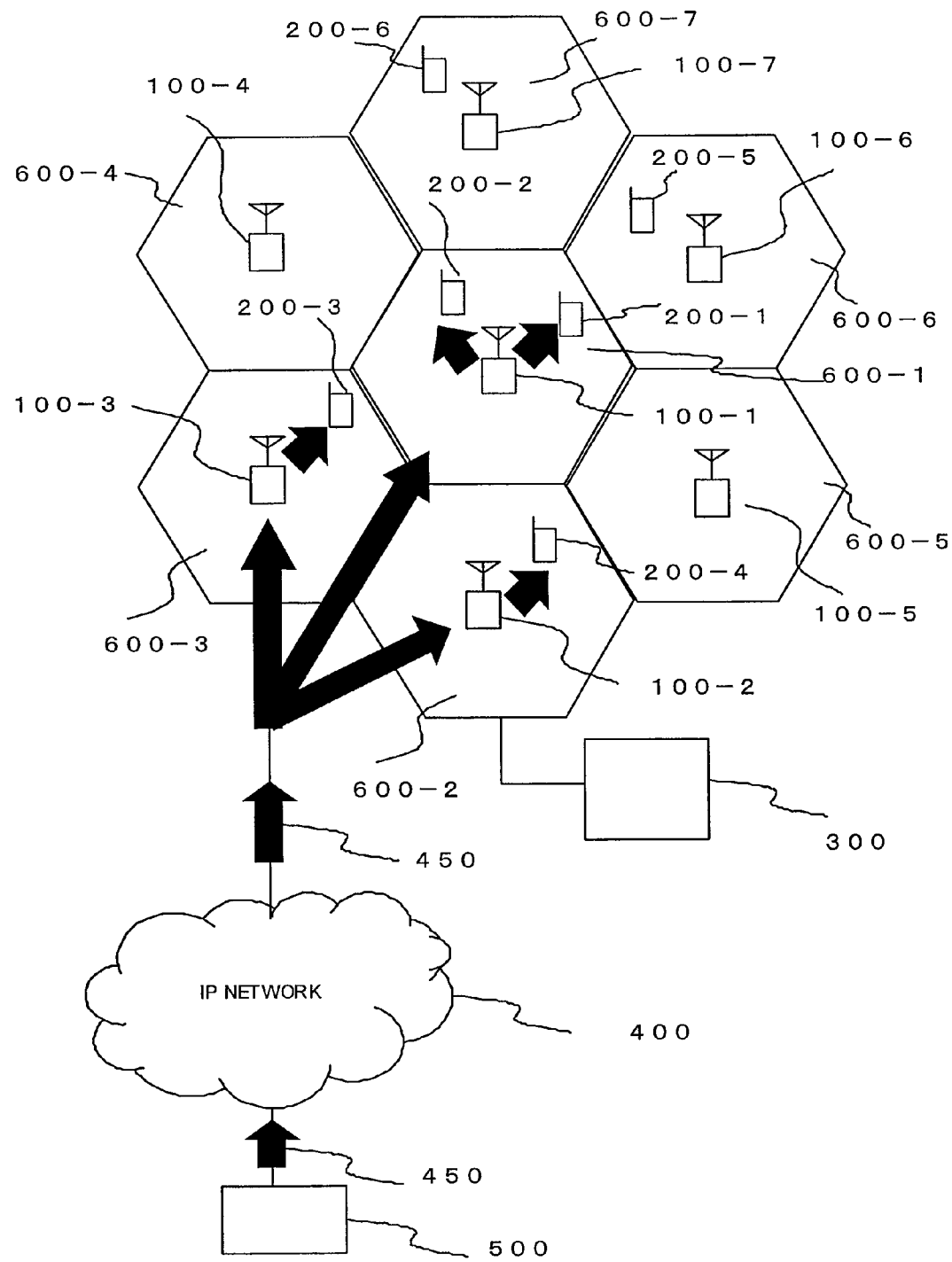
FIG. 1 is a diagram showing the topology of a radiocommunication network in an embodiment of the present invention.

A description will be made below by introducing multiple embodiments.

1. First Embodiment 1-1 Outline

An embodiment will be described below by taking for instance a case where a packet format for multicast communication disclosed in the non-patent document 1 is used to perform multicast communication. Incidentally, the packet format is not limited to the introduced one but may be any other appropriate format.

In the present embodiment, each of base stations supports two modes for multicast communication. The two modes, for example, a redundant transmission mode in which: multiple radio bands are assigned to distribution of a multicast content; and the same multicast data is transmitted in the multiple radio bands in order to realize a redundant construction for multicast communication, and a normal transmission mode (or a uni-communication mode) in which the redundant construction is not adopted but the multicast content is transmitted in a sole radio band are designated. The transmission modes will be described below.

(1) Redundant Transmission Mode

In the redundant transmission mode, a base station assigns one multicast content (a multicast flow or multicast data) to multiple multicast radio resources so as to perform communication. When multicast data is transmitted in the redundant transmission mode, even if a wireless terminal detects a receiving error in data received by way of a certain multicast radio resource, data items received by way of the other multicast radio resources are used to decode the multicast content. Therefore, the receiving quality to be observed by an end user can be improved. On the terminal side, processing of discarding redundantly received data items is carried out.

(2) Normal Transmission Mode

In the normal transmission mode, a multicast content is assigned to one multicast radio resource in order to perform communication.

If the foregoing redundant transmission mode is applied to a base station whose communication quality is degraded for some reason, it would prove effective in improving the certainty of distribution of multicast data. However, if the redundant transmission mode is applied to all base stations including a base station whose communication quality is high, radio resources would be wasted.

Therefore, a base station whose communication quality is degraded is selected and the redundant transmission mode is applied to the base station. The normal transmission mode is applied to the other base stations in order to facilitate efficient use of radio resources.

In existing multicast communication, a means for statistically managing the receiving qualities of terminals has not been established. There is difficulty in identifying a base station whose communication quality is degraded.

Now, an embodiment in which receiving qualities of terminals are statistically managed, a base station whose communication quality is degraded is identified, and multicast data is distributed will be described below.

When a radiocommunication system is constituted as described later, a radiocommunication system in which the communication qualities of respective terminals are estimated based on the results of measurements performed in advance on the communication qualities of the terminals, and information stored in a database in a base station area within which data is distributed, and the redundant transmission mode or normal transmission mode is autonomously selected for each base station can be provided. Since the transmission mode can be designated for each wireless base station, the resistibility of each of wireless terminals, which exist in the range of a wireless base station, to an error in received data can be improved. Further, since a base station acquires the communication qualities measured at the respective terminals and pieces of information on viewing of a multicast content at the respective terminals, an environment in which a maintenance person can statistically manage and utilize the pieces of quality information and viewing information can be provided.

In the present embodiment, a description will be made by taking for instance a case where a test application protocol disclosed in the non-patent document 2 is adopted as a means to be used to measure receiving qualities by a wireless base station.

The test application protocol is a protocol having the capability of allowing a wireless base station to assign data of a test pattern to a radio resource and to transmit the data to wireless terminals for a certain time, and allowing each of the wireless terminals to count the number of normally decoded data items and to return the result of the counting to the base station. Aside from the protocol, any appropriate means may be used to measure the receiving qualities of terminals.

In the present embodiment, before a multicast flow is distributed, the test application protocol is invoked in advance at each wireless base station in order to measure a mean value of packet error rates of wireless terminals existing in the communication area of the wireless base station. Based on the result of the measurement, either the redundant transmission mode or normal transmission mode is selected to perform communication.

A base station set to the redundant transmission mode assigns redundant multicast data to multiple radio resources for subsequent distribution of a multimedia content, whereby the error resistibility of each wireless terminal is improved. In contrast, a base station set to the communication transmission mode assigns one radio resource to distribution of multicast content data, assigns the other radio resources to the other usages including unicast data, and thus facilitates efficient use of the radio resources.

1-2 System Constitution

A network constitution in the present embodiment will be described in conjunction with drawings.

FIG. 1 is a block diagram showing an example of the constitution of a radiocommunication system to which the present invention is applied. The present system includes multiple wireless base stations (100-1, etc., and 100-7), multiple wireless terminals (200-1, etc., and 200-6), a wireless base station management apparatus 300, and a content server 500 that communicates with each of the base stations 100 over an IP network 400. Herein, a regional range within which each of the base stations 100 can communicate data to or from the wireless terminals 200 shall be called a cell (any of 600-1, etc., and 600-7). In the example shown in FIG. 1, the wireless terminal 200-1 or 200-2 existent in the cell 600-1 can communicate data to or from the base station 100-1 by radio.

Figure 2:
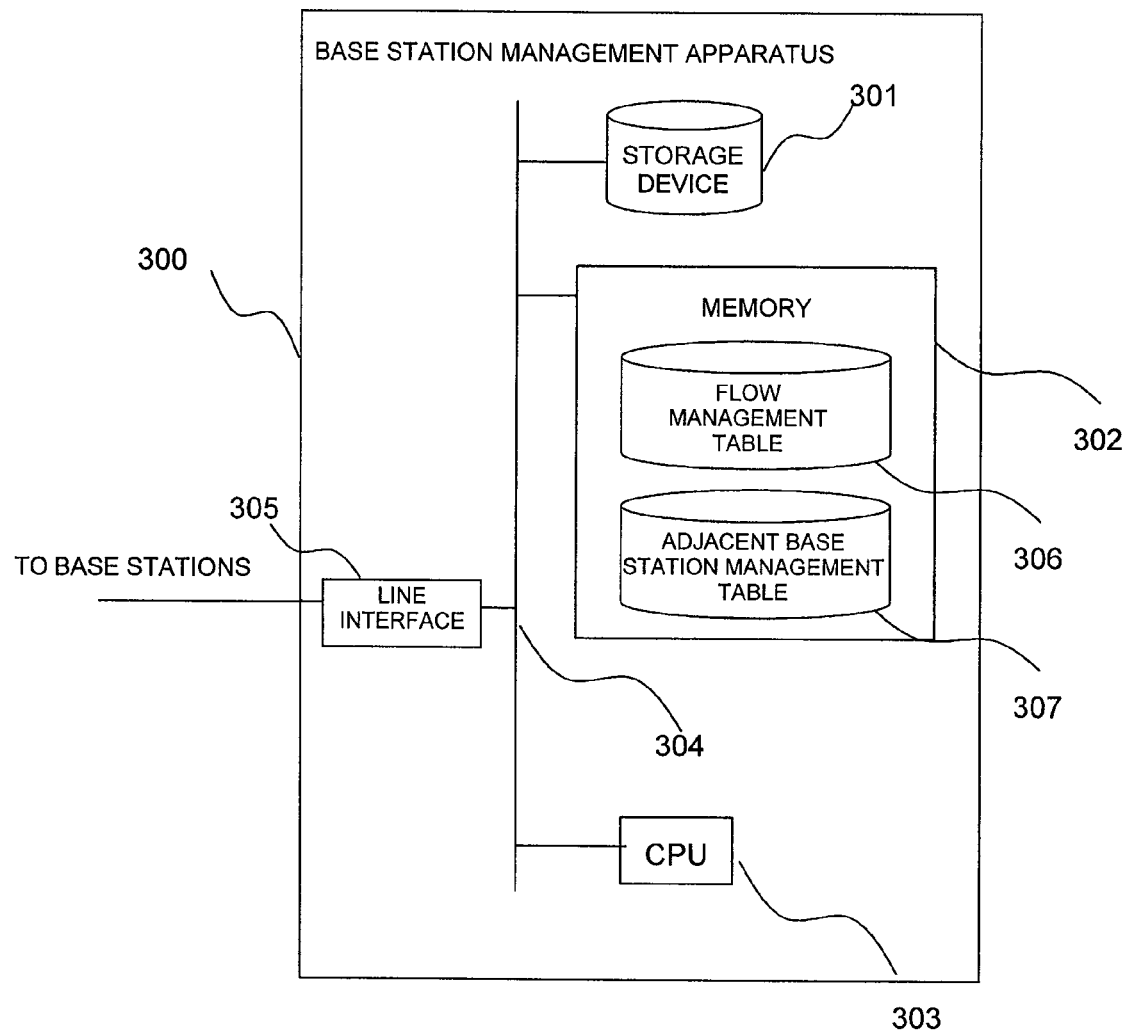
FIG. 2 is a block diagram showing an example of the constitution of a base station management apparatus in the embodiment of the present invention.

FIG. 2 is a block diagram showing the base station management apparatus 300 that monitors and controls the base stations.

The base station management apparatus 300 internally includes a storage device 301, a memory 302, a CPU (first control unit) 303, and a line interface (first line interface) 305, and has a hardware constitution having these components interconnected over an internal bus 304. In the memory, a flow management table (first flow management table) 306 to be used to manage distribution areas of multicast flows and an adjacent base station management table 307 holding pieces of information on the relationships of adjacency among the wireless base stations are preserved. The tables 306 and 307 may be preserved in the storage device 301. In the present embodiment, the adjacent base station management table 307 may be excluded.

FIG. 3 shows an example of the construction of the flow management table 306.

In the flow management table 306, for example, a distribution beginning time instant 306-2, a distribution end time instant 306-3, one or multiple object-of-flow distribution base stations 306-4 are stored in association of each flow identifier (ID) 306-1. An error rate measurement time 306-5, a transmission mode switching threshold 306-6, a packet error rate 306-7, and an operating transmission mode 306-8 are stored in association with each of the object-of-flow distribution base stations 306-4.

The flow ID (306-1) is an identifier assigned to a multicast content to be distributed. The distribution beginning time instant (306-2) and distribution end time instant (306-3) are a scheduled time instant at which distribution of a content to wireless terminals is begun and a scheduled time instant at which distribution of a content is ceased. The object-of-flow distribution base station (306-4) includes one or more identifiers of base stations that are objects of distribution to which a content is distributed. For example, a time instant, a region, and an area to which a content is distributed is determined in advance, and identifiers of base stations associated with the region and area are stored. The error rate measurement time (306-5) indicates a packet error rate measurement time which each wireless terminal takes using the test application protocol. The transmission mode switching threshold (306-6) indicates a threshold for packet error rates to be referenced when the processing of selecting the redundant transmission mode or normal transmission mode is performed at each object-of-flow distribution base station 306-4. In the packet error rate (306-7), the result of error rate measurement performed using the test application protocol at the wireless base station is stored. In the operating transmission mode (306-8), either the redundant transmission mode or normal transmission mode is stored as a transmission mode in which the wireless base station operates.

The data items 306-1, 306-2, 306-3, 306-4, 306-5, and 306-6 serve as parameters which a maintenance person inputs to the base station management apparatus 300 and which are stored in advance in the flow management table 306. In contrast, as the data items 306-7 and 306-8, values or data items notified by the base station 100 are stored. For example, each content has the distribution beginning and end time instants thereof and the distributing base station thereof determined in advance.

Figure 4:
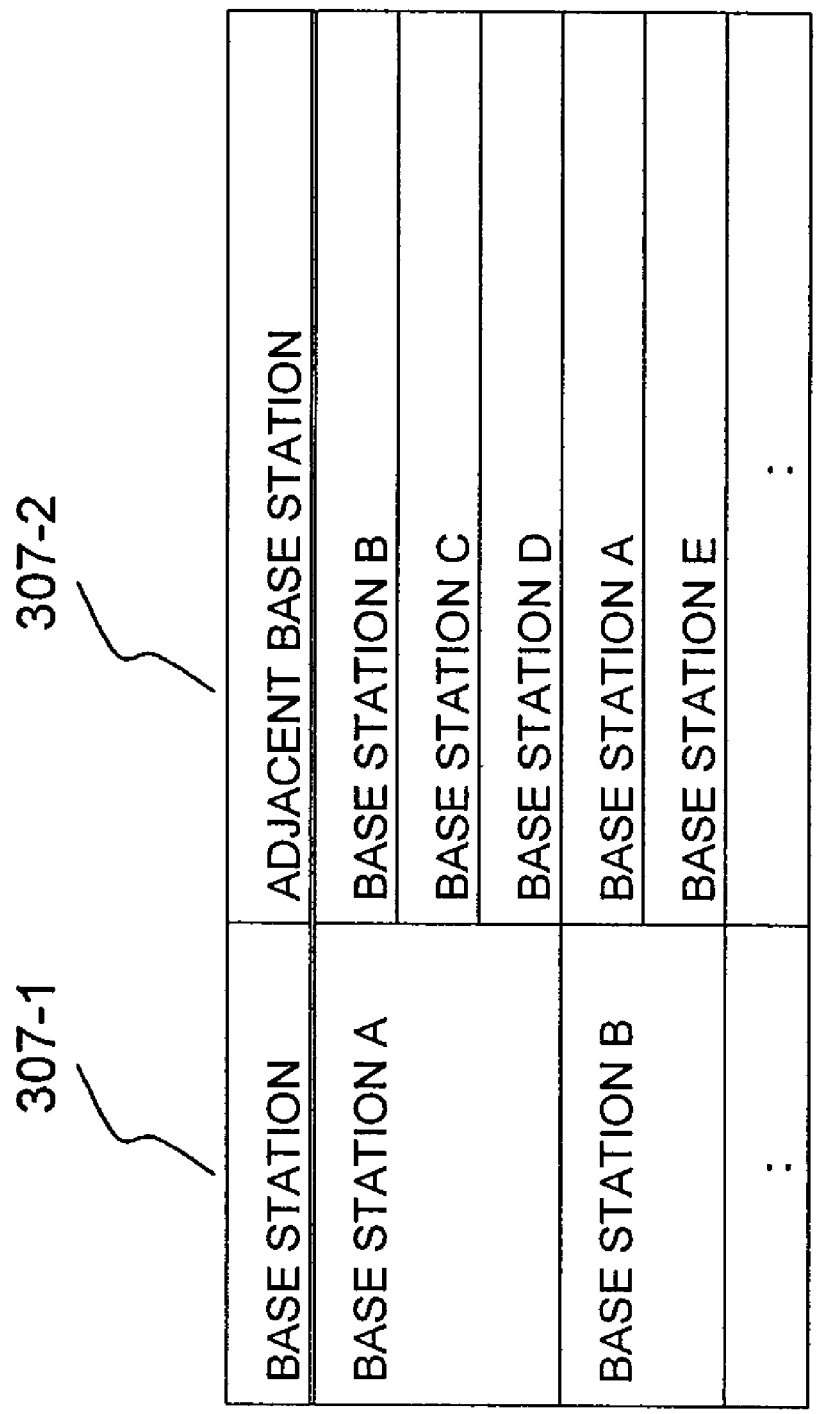
FIG. 4 is a diagram showing the construction of an adjacent base station management table preserved in the base station management apparatus in the embodiment of the present invention.

FIG. 4 shows an example of the construction of the adjacent base station management table 307. The table 307 is used to manage the base stations (307-2) each having the relationship of adjacency to the base station (307-1). Herein, what is referred to as the relationship of adjacency is the relationship of a certain base station to base stations associated with peripheral cells. In the example shown in FIG. 1, the adjacent base stations of the base station 100-1 include the base stations 100-2, etc., and 100-7. The table 307 is updated when the number of base stations 100 is increased or decreased or the topology is modified.

Figure 5:
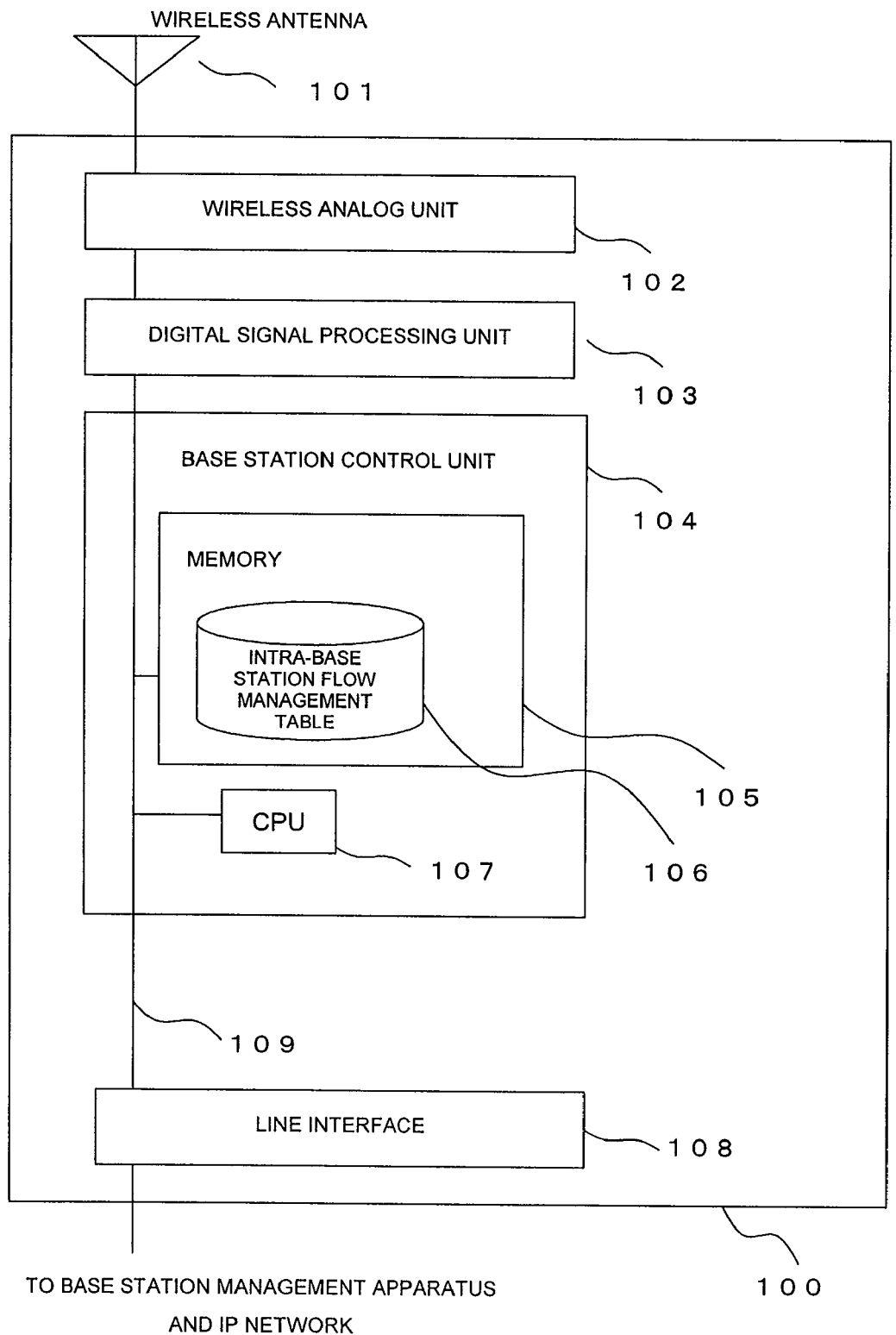
FIG. 5 is a block diagram showing an example of the constitution of a base station in the embodiment of the present invention.

FIG. 5 is a block diagram showing the constitution of the wireless base station 100-1. The wireless base stations 100-2, etc., and 100-7 have the same constitution.

The wireless base station 100 includes, for example, a wireless antenna 101, a wireless analog unit 102 connected to the wireless antenna 101, a digital signal processing unit 103 connected to the wireless analog unit 102, a line interface (second line interface) 108 connected to the base station management apparatus 300 and IP network, and a base station control unit 104, and has these components interconnected over an internal bus 109.

The wireless analog unit 102 converts an analog signal, which is received from any of the wireless terminals 200 through the wireless antenna 101, into a digital signal, and outputs the digital signal to the digital signal processing unit 103. In addition, the wireless analog unit 102 converts the digital signal received from the digital signal processing unit 103 into the analog signal (radio wave), and transmits the analog signal to the wireless terminals 200 through the antenna 101. The digital signal processing unit 103 demodulates the digital signal (upstream signal) received from the wireless analog unit 102 or modulates a downstream signal addressed to the wireless terminals 200. The line interface 109 transmits or receives a packet to or from the base station management apparatus 300 or IP network 400.

The base station control unit 104 controls the whole of the base station 100 on a centralized basis, and includes, for example, a memory 105 and a CPU (second control unit) 107. In the memory 105, an intra-base station flow management table (second flow management table) 106 is stored. The base station control unit 104 may include, for example, a facility that manages pieces of information on time instants acquired from a GPS or the like.

FIG. 6 shows the construction of the intra-base station flow management table 106.

The intra-base station flow management table 106 has, for example, a flow ID 106-1, a distribution beginning time instant 106-2, a distribution end time instant 106-3, an error rate measurement time 106-4, a transmission mode switching threshold 106-5, a packet error rate 106-6, and an operating transmission mode 106-7 stored in association with one another. As the flow ID (106-1), distribution beginning time instant (106-2), distribution end time instant (106-3), error rate measurement time (106-4), and transmission mode switching threshold (106-5), the same values or data items as those registered in the flow management table 306, which is stored in the base station management apparatus 300, in association with the flow ID and the ID of the own base station are stored, or in other words, values designated by a maintenance person and contained in a flow booking message sent from the base station management apparatus 300 are specified. As the packet error rate (106-6), the result of error rate measurement based on the test application protocol is designated by the base station control unit 104. The operating transmission mode (106-7) refers to a transmission mode in which the own wireless base station 100 operates is designated. The redundant transmission mode or normal transmission mode is designated by the base station control unit 104 according to the result of comparison of the result of error rate measurement 106-6 with the transmission mode switching threshold 106-5. As for the packet error rate (106-6) and operating transmission mode (106-7), when the values are updated by the base station control unit 104, they are notified the base station management apparatus 300 and stored (or updated) in association with the flow ID and object-of-flow distribution base station specified in the flow management table 306.

The content server 500 shown in FIG. 1 is an apparatus which is manipulated by a maintenance person in order to accumulate multicast contents, each of which includes sounds and a motion picture, and includes a facility that when a content distribution time instant has come, transmits a flow to the object-of-distribution base stations 100.

1-3 Actions

Figure 7:
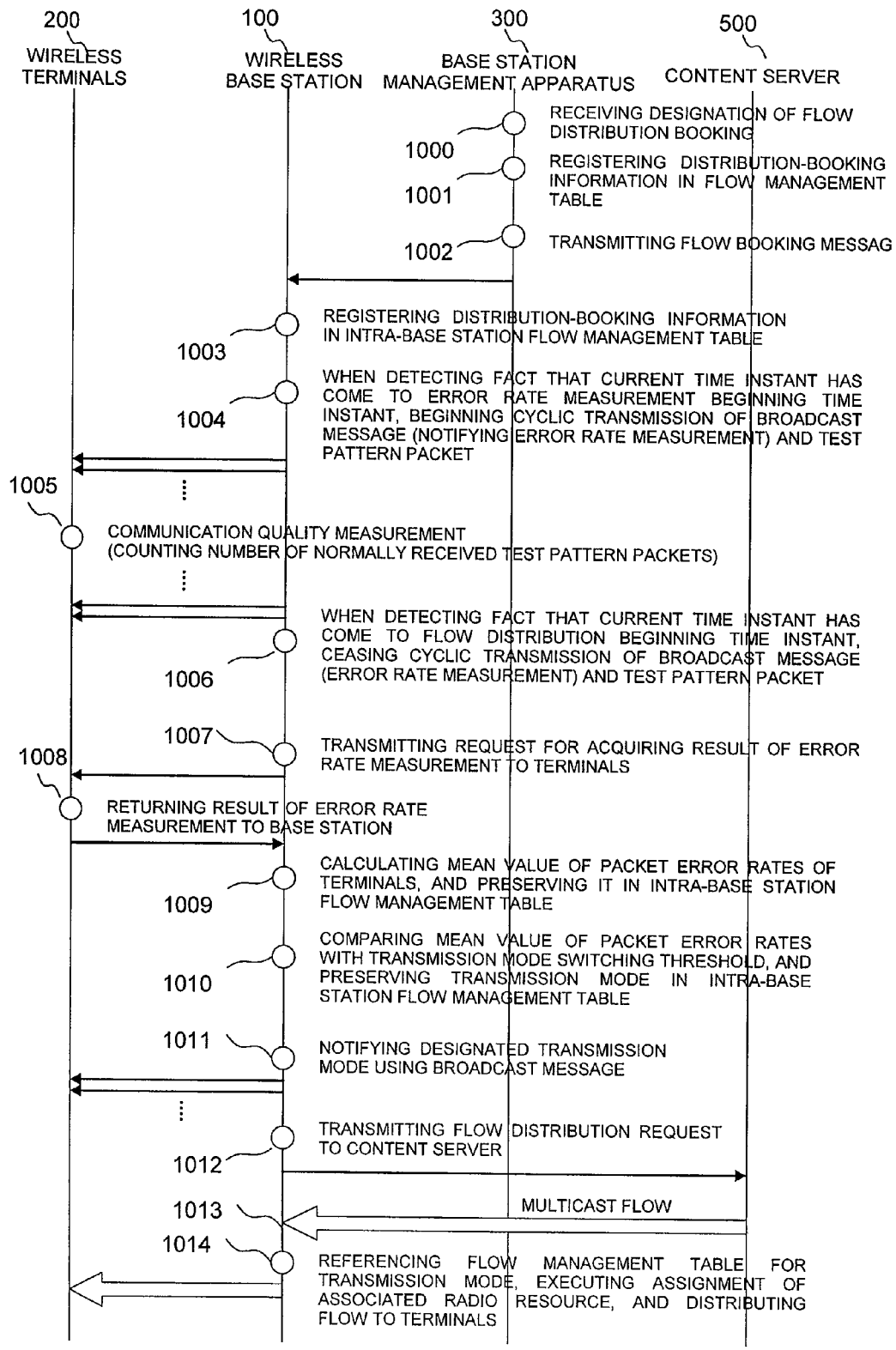
FIG. 7 is a sequence diagram, which ends with distribution of a multicast flow, in the embodiment of the present invention.
Figure 8:
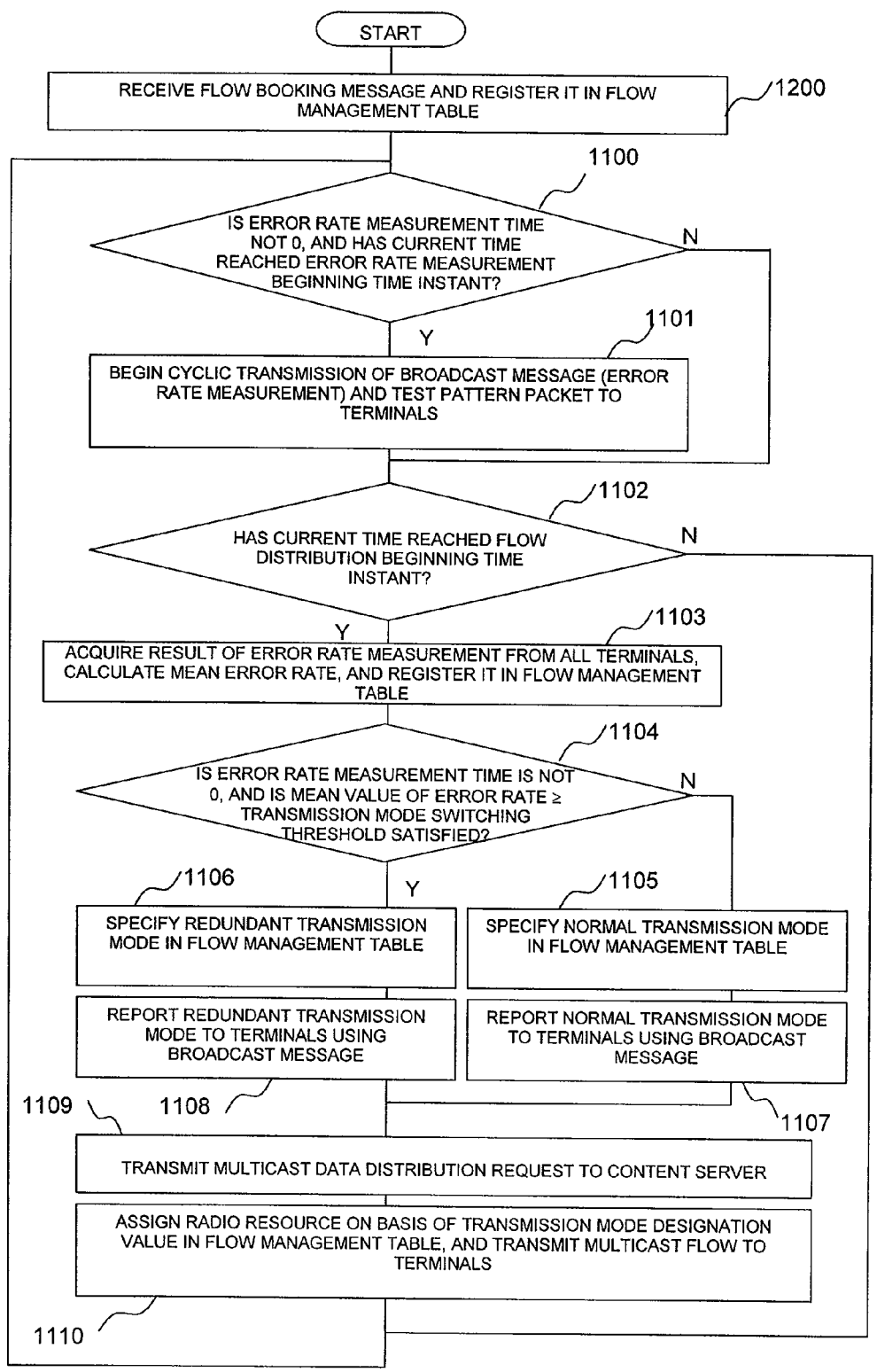
FIG. 8 is a flowchart describing an example of control logic, which ends with a step at which the base station control unit distributes a multicast flow, in the embodiment of the present invention.

FIG. 7 shows a sequence of a flow distribution procedure. FIG. 8 shows a processing flow equivalent to pieces of processing 1003 to 1014 in FIG. 7 and followed by the base station control unit 104.

The base station management apparatus 300 stores the flow ID, distribution beginning time instant, distribution end time instant, object-of-flow distribution base stations, error rate measurement time, and transmission mode switching threshold, which are entered by a maintenance person through an operation (1000) for designating distribution booking, in the flow management table 306 (1001). For example, the flow ID, distribution beginning time instant, distribution end time instant, and object-of-flow distribution base stations may be received from the content server 500 or any other appropriate apparatus that manages flow distributions. Thereafter, the base station management apparatus 300 transmits a flow booking message to the base stations 100 specified in the object-of-flow distribution base station (306-4) (1002). Herein, the flow ID, distribution beginning time instant, distribution end time instant, error rate measurement time, and transmission mode switching threshold that are stored in the flow management table 306 are embedded in the flow booking message, and the flow booking message is transmitted.

In each of the wireless base stations (100-1, 100-2, and 100-3) having received the flow booking message, the base station control unit 105 stores the flow ID, distribution beginning time instant, distribution end time instant, error rate measurement time, and transmission mode switching threshold, which are contained in the received flow booking message, in the respective fields 106-1, 106-2, 106-3, 106-4, and 106-5 in the intra-base station flow management table (106) (1003, 1200). In the present embodiment, the recorded information may be referred to as distribution-booking information. The base station control unit 105 cyclically performs the processing of comparing a current time instant, which is acquired from a GPS or the like, with the distribution beginning time instant of a flow registered in the intra-base station flow management table 107 and the error rate measurement time (1100). When detecting that the current time instant has come to the error rate measurement beginning time instant (flow distribution beginning time instant–error rate measurement time) for a certain flow (1100, Y), the base station control unit 105 begins measuring a packet error rate of each wireless terminal using the test application protocol (1004, 1101). At this time, a broadcast message stipulated in the standard is cyclically transmitted to the wireless terminals, whereby the fact that error rate measurement is in progress is reported to the existent wireless terminals. Distribution of a test pattern packet can be begun. Aside from the use of the test application protocol, an appropriate packet intended to measure a packet error rate may be employed. Incidentally, data to be measured is not limited to the packet error rate but may be appropriate data representing the receiving quality of a wireless terminal. If the error rate measurement time is 0, the error rate measurement is recognized not to be carried out and the procedure proceeds to processing 1102.

In the wireless terminals, the processing of counting the number of normally received test pattern packets is executed during a period during which Error Rate Measurement In-progress is reported with a broadcast message (1005). For example, wireless terminals permitted in advance to receive multicast data execute the processing 1005.

In each of the base stations 100, for example, when the fact that the current time instant has come to a flow distribution beginning time instant for a flow concerned is detected (1102), distribution of the broadcast message, with which Error Rate Measurement In-progress is reported, and the test pattern packet is ceased (1006), and a request for acquisition of the result of error rate measurement is transmitted to the wireless terminals that have undergone error rate measurement (1007). The base stations 100 may perform the pieces of processing at a time instant that is earlier by a predetermined time than the flow distribution beginning time instant. In response to the request, the wireless terminals 200 return the count value, which represents the number of normally received test pattern packets, to the base station 100 (1008). The base station control unit 104 requests all the wireless terminals, which have undergone the measurement, for the result of error rate measurement. For example, the base station control unit 104 receives the test pattern packet count value from each of the wireless terminals 200, and obtains the packet error rate of the receiving terminal on the basis of the number of packets transmitted through the pieces of processing 1004 to 1006 and the received count value. The base station control unit 104 obtains a mean value of the acquired results of error rate measurements (1103), and registers the packet error rates (106-6) in the intra-base station flow management table (106) in association with the flow ID (1009).

The base station control unit 104 performs the processing of comparing each of the packet error rates (106-6), which are registered in the flow management table 106, with each of the transmission mode switching thresholds (106-5). When detecting that the error rate measurement time is not 0 and the mean value of packet error rates is equal to or larger than the transmission mode switching threshold (1104, Y), the base station control unit 104 specifies the redundant transmission mode in the operating transmission mode (106-7) in the flow management table 106 (1010, 1106). In contrast, when the mean value of error rates falls below the transmission mode switching threshold or the error rate measurement time is 0 (1104, N), the base station control unit 104 specifies the normal transmission mode (1010, 1105). Thereafter, cyclic transmission of a broadcast message stipulated in the standard is performed in order to report a radio resource, which is used in the operating transmission mode (106-7) specified in the flow management table 106, to each of the wireless terminals 200 (1011, 1108, 1107).

The base station control unit 104 transmits a multicast data transmission request to the content server 500 (1012, 1109). The content server 500 transmits a designated multicast flow to the wireless base station 100 (1013). The base station control unit 104 having received the flow from the content server 500 identifies the flow ID, references the flow management table 106, assigns a radio resource that is associated with the registered transmission mode, and transmits the flow to the wireless terminals 200 (1014, 1110).

Figure 9:
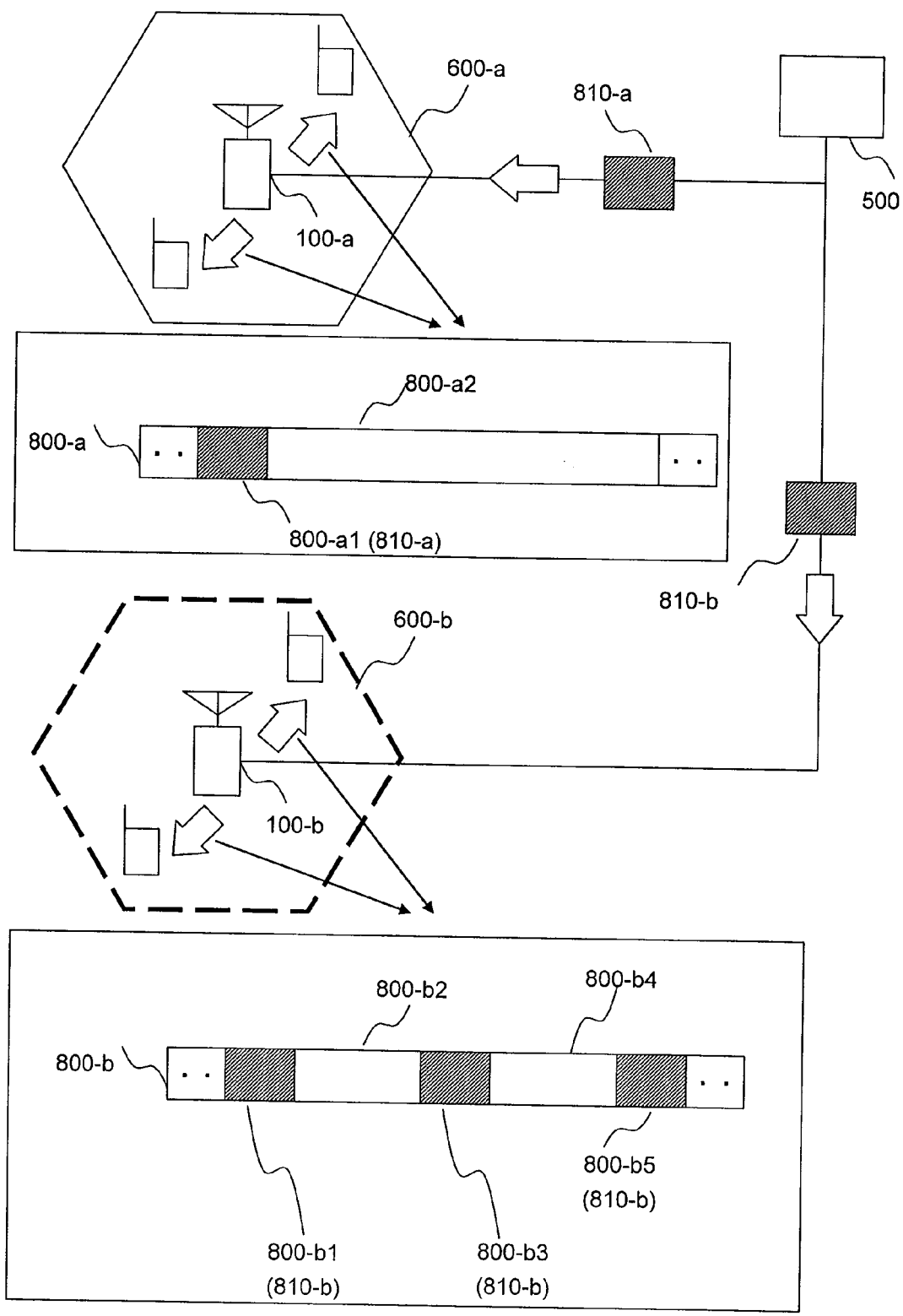
FIG. 9 is an explanatory diagram showing a radio resource assignment means for a multicast data in the embodiment of the present invention.

FIG. 9 shows the concept of the foregoing processing.

In the drawing, a cell 600-*a* is a cell whose propagation environment is satisfactory, and a base station 100-*a* is set to the normal transmission mode. In contrast, a cell 600-*b* is a cell whose propagation environment has deteriorated, and a base station 100-*b* is set to the redundant transmission mode. Multicast data items 810-*a* and 810-*b* that are identical to each other are transmitted from the content server 500 to the respective base stations 100-*a* and 100-*b*. The multicast data items may be copies of data, which is transmitted from the content server 500, produced by an appropriate apparatus.

A base station (100-*b*) that has the redundant transmission mode specified in the flow management table 106 because the results of measurements of packet error rates are unsatisfactory redundantly assigns the same multicast data (810-*b*) to multiple radio resources (800-*b*1, 800-*b*3, and 800-*b*5), and transmits the multicast data to the wireless terminals. In the resources 800-*b*3 and 800-*b*5, retransmission data of the multicast data transmitted in the resource 800-*b*1 is transmitted. In resources 800-*b*2 and 800-*b*4, for example, unicast data is transmitted.

A base station (100-*a*) that has the normal transmission mode specified in the flow management table because the results of measurements of packet error rates are satisfactory assigns multicast data (810-*a*) to one radio resource (800-*a*1) alone, transmits the multicast data to the wireless terminals, and thus efficiently uses the resources. In the resource 800-*a*2, for example, unicast data is transmitted.

Each of the wireless terminals 200 to which the multicast flow is distributed decodes data according to radio-resource information specified in a broadcast message. Each of the wireless terminals 200 existing within the range of the base station 100 set to the normal transmission mode decodes the data in the sole multicast radio resource. In contrast, each of the wireless terminals 200 existing within the range of the base station 100 set to the redundant transmission mode selects normally received data from among data items in the multiple radio resources, and decodes the data. Eventually, an end user can view a content.

The base station control unit 104 that has detected the distribution end time instant for a flow ceases reporting of the broadcast message, and also ceases distribution of data from the content server 500.

Incidentally, the base station management apparatus 300 checks the flow management table (306) to see if the contents of the flow management table square with the contents of the intra-base station management table (106) preserved in each of the base stations 100. If the contents of the flow management table do not square with the contents of the intra-base station management table, the data stored in the flow management table 306 in the base station management apparatus 300 is transmitted to the base station 100 in order to perform squaring processing. If the base station 100 is reset or restarted, or if the discontinuity in communication between the base station 100 and the base station management apparatus 300 is restored, the base station management apparatus 300 executes the squaring processing and transmits a distribution booking message to the base station 100 in relation to the portion of the flow management table 306 that is associated with the base station but that does not square with the intra-base station management table (106). Thus, consistency is guaranteed.

In the foregoing embodiment, the mean value of error rates of all terminals 200 having undergone error rate measurement is obtained. The obtained mean value is compared with the transmission mode switching threshold in order to select the normal transmission mode or redundant transmission mode. Aside from the method of obtaining the mean value of error rates, an appropriate value may be obtained based on the error rates in order to discriminate the base station 100 that has receiving qualities degraded. For example, the terminal 200 lying in an environment in which an error rate is highest, that is, the receiving quality is worst is selected as an object from among the terminals 200 to be measured. The error rate is compared with the transmission mode switching threshold in order to designate the transmission mode. Thus, the terminals subordinate to the base station and including the terminal lying in the worst-receiving quality environment are expected to normally receive a multicast flow.

If the number of terminals 200 existing within the range of a certain base station, that is, the number of terminals having undergone measurement is small, statistically accurate measured values of data receiving qualities in the base station area may not be obtained. In this case, if the number of terminals having provided results of measurements is equal to or smaller than a certain number of terminals, the previously designated transmission mode may be designated again.

The number of radio resources employed in the redundant transmission mode may be determined based on an error rate. For example, if the measured error rate is equal to or smaller than a predetermined threshold, two radio resources may be assigned. If the error rate exceeds the threshold, three radio resources may be assigned. Multiple thresholds may be defined in order to hierarchically determine the number of radio resources. For example, since the number of times by which data is redundantly transmitted from a base station that has high error rates measured is large, the certainty in distribution of multicast data increases. Further, since the number of times by which data is redundantly transmitted from a base station that has low error rates measured is not large, unnecessary redundant transmission can be avoided.

2. Second Embodiment

In error rate measurement using a test application protocol, a certain radio resource is consumed. Therefore, an area or range within which the error rate measurement is carried out may presumably be limited to the area or range of a base station that is located near the border of a flow distribution area and that is expected to cause terrible quality degradation. This facility can be realized by installing the processing of identifying a border base station in a distribution area on the basis of an adjacent base station database stored in the base station management apparatus, which monitors and controls the base stations, and databases in an object-of-multicast flow distribution base stations.

In the first embodiment, an example in which error rate measurement is carried out at all base stations is introduced. In the second embodiment, an example in which the error rate measurement is carried out at only a base station that is located near the border of a content distribution area and that is susceptible to interference by an adjacent cell will be introduced.

According to the present embodiment, in addition to the advantage of the first embodiment, limiting a base station, which carries out error rate measurement, to a border area provides the advantage of being able to avoid wasting of radio resources, which accompanies the error rate measurement, at base stations that do not carry out the measurement.

Figure 10:
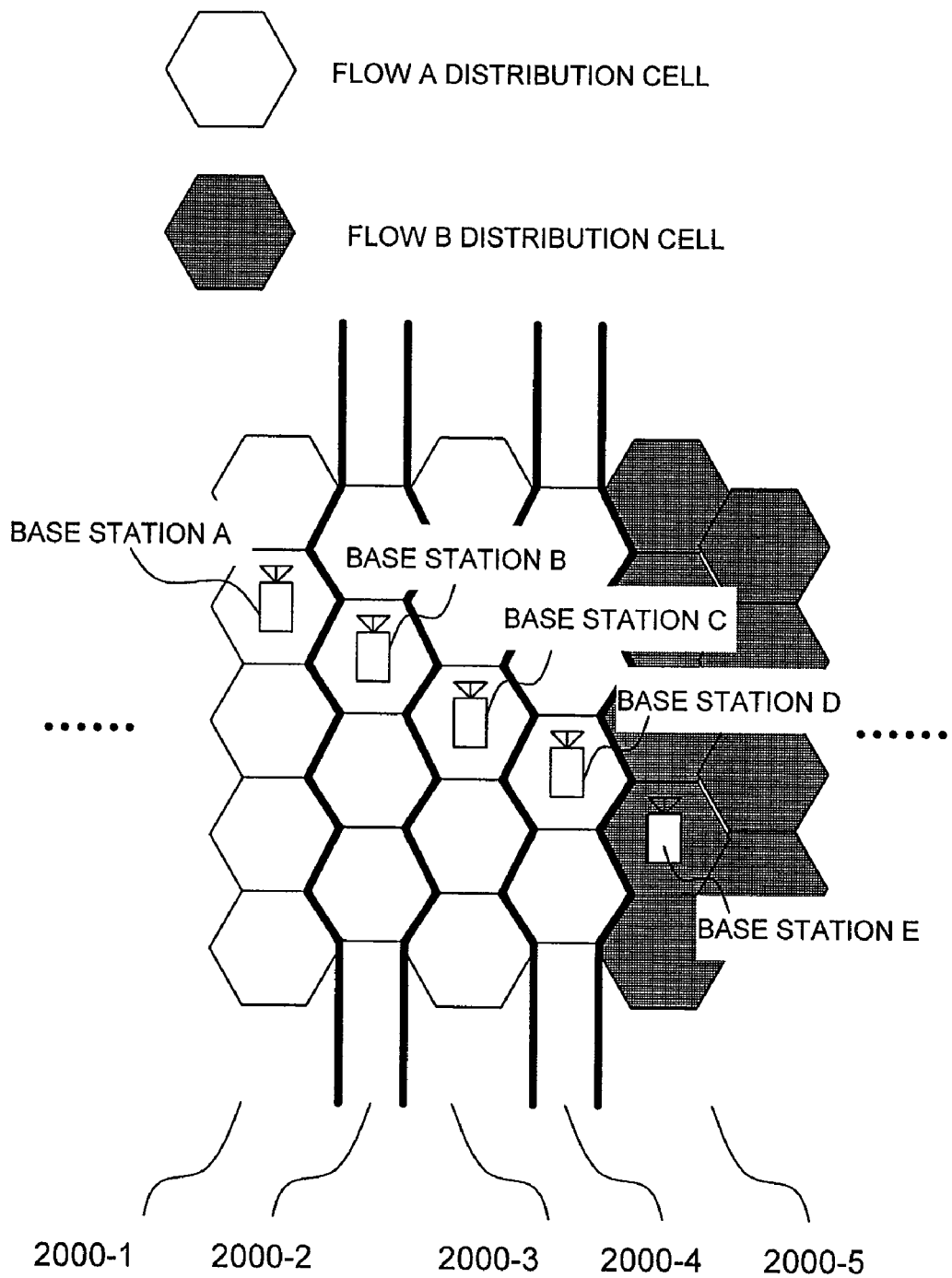
FIG. 10 is an explanatory diagram concerning an algorithm for extracting a base station group on the border of a distribution area in the embodiment of the present invention.

FIG. 10 shows the topology of abase station in the present embodiment.

Cell groups 2000-1, 2000-2, 2000-3, and 2000-4 define areas within which a content of a flow A is distributed, and a cell group 2000-5 defines an area within which another flow B is distributed at a time instant overlapping the time instant of the distribution of the flow A. In this drawing, a base station A belongs to the area 2000-1, a base station B belongs to the area 2000-2, a base station C belongs to the area 2000-3, a base station D belongs to the area 2000-4, and a base station E belongs to the area 2000-5.

FIG. 11 shows an example of the construction of the flow management table 306 in the base station management apparatus 300 in accordance with the present embodiment. The flow management table 306 further contains information on an error rate measurement hierarchy 306-9'. The other data items are identical to those in the first embodiment. For example, a flow ID assigned to the flow A in FIG. 10 shall be 0001, and a flow ID assigned to the flow B shall be 0002.

FIG. 12 shows an example of an adjacent base station management table 2100 relating to the topology shown in FIG. 10. The table 2100 is equivalent to the table 307 in the first embodiment.

Figure 13:
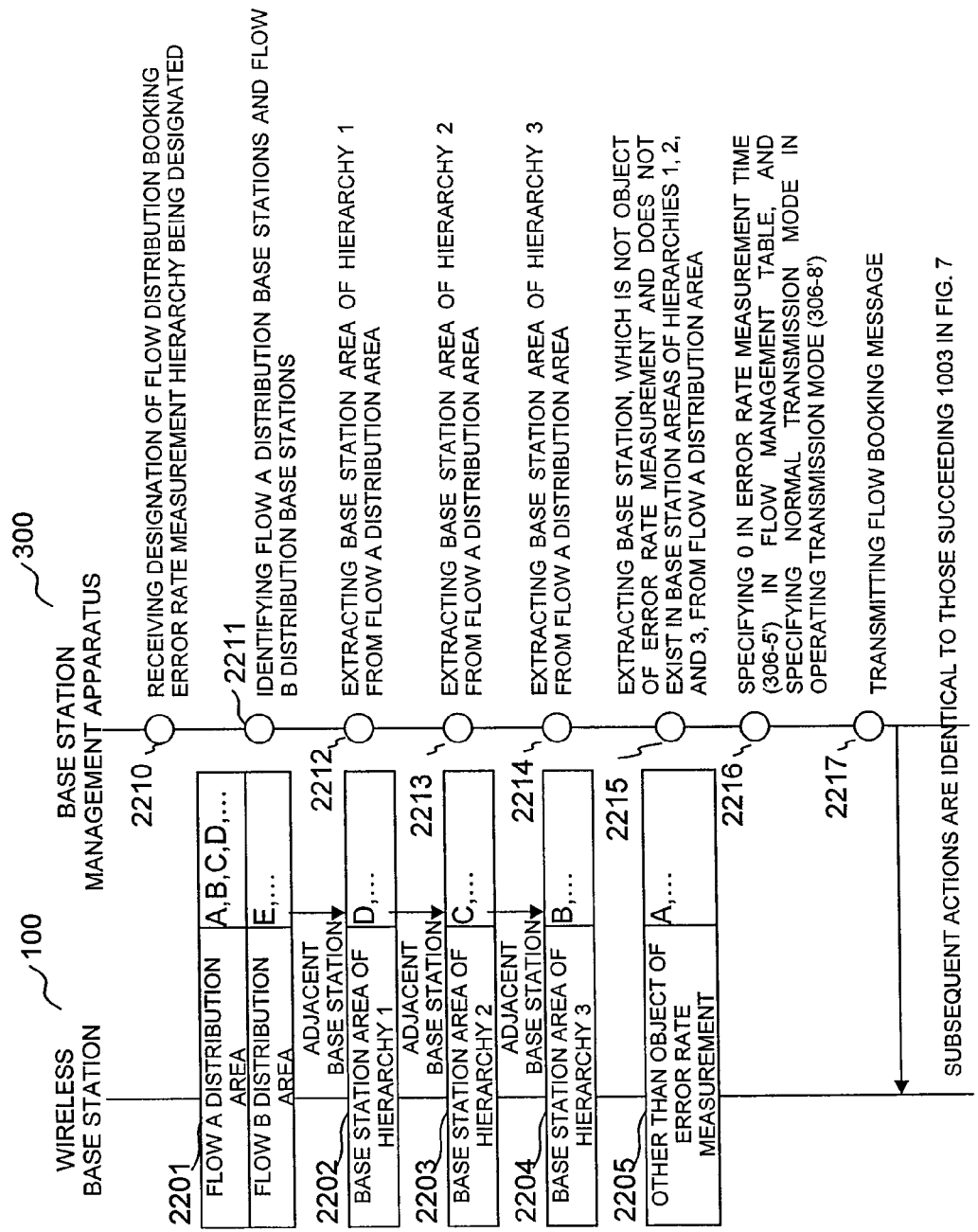
FIG. 13 is a processing flowchart relating to a base station management apparatus 300.

FIG. 13 shows a processing flow to be followed by the base station management apparatus 300 in the present embodiment. Compared with the first embodiment, a series of pieces of processing ranging from the processing 1000 in FIG. 7 to the processing 1002 therein is replaced with the pieces of processing shown in FIG. 13.

To begin with, for example, the base station management apparatus 300 performs an operation of designating distribution booking responsively to a maintenance person's manipulation (2210). In the present embodiment, in addition to the data items employed in the first embodiment, a designative value (error rate measurement hierarchy) of a hierarchical level of an area that signifies how far away a base station included in base stations, which carry out error rate measurement, is separated from a distribution border is entered. The entered designative value is registered in the error rate measurement hierarchy 306-9' in the flow management table 306. In this example, a description will be made of a case where the error rate measurement hierarchy for the flow A (flow ID: 0001) is set to 3.

To begin with, the base station management apparatus 300 references the field of an object-of-flow distribution base station (306-4') in the flow management table 306 so as to extract IDs of base stations belonging to a flow A distribution area (2000-1, 2000-2, 2000-3, and 2000-4) and a flow B distribution area (2000-5). In this example, the IDs of the base stations A, B, C, and D stored in the object-of-flow distribution base station 306-4' in association with the flow ID of 0001 are extracted as the IDs of the base stations belonging to the flow A distribution area, and the ID of the base station E stored in the object-of-flow distribution base station 306-4' in association with the flow ID of 0002 is extracted as the ID of the base station belonging to the flow B distribution area (2211). The base station management apparatus 300 stores in the memory thereof the extracted IDs of the base stations in association with the distribution areas. In the drawing, reference numerals 2201 to 2205 denote examples of data items stored in the memory of the base station management apparatus 300.

Thereafter, the base station management apparatus 300 references the adjacent base station management table 2100 so as to search the table from the leading end to the trailing end, and extracts base stations, which have the relationship of adjacency with the base station belonging to the flow distribution area B, from among the base stations existent in the flow distribution area A (2212). The extracted base station group shall be regarded as existing in a border area (2000-4) of hierarchy 1. In this example, the ID of the base station D having the relationship of adjacency to the base station E belonging to the flow distribution area B is extracted as existing in the border area of hierarchy 1 (2202). The base station management apparatus 300 stores in the memory thereof the extracted ID of the base station as the one existent in the border area of hierarchy 1 (2202 in the drawing).

Thereafter, the base station management apparatus 300 extracts base stations, which have the relationship of adjacency to the base station in the border area 2000-4 of hierarchy 1, from among base stations that belong to the flow distribution area A but do not exist in the border area (2000-4) of hierarchy 1 (2213). The extracted base station group is regarded as existing in a border area (2000-3) of hierarchy 2. The base station management apparatus 300 stores in the memory thereof the extracted IDs of the base stations as those existent in the border area of hierarchy 2 (2203 in the drawing).

According to the same procedure as the foregoing one, base station groups of hierarchy 3 (2000-2), hierarchy 4 (2000-1), etc. ending with an error rate measurement hierarchical level registered in the flow management table 306 are sequentially obtained (2214). In this example, the base station C having the relationship of adjacency to the base station D existent in the border area of hierarchy 1 is extracted as the one existent in the border area of hierarchy 2 (2203). Likewise, the base station B having the relationship of adjacency to the base station C existent in the border area of hierarchy 2 is extracted as the one existent in the border area of hierarchy 3 (2204). Since the error rate measurement hierarchy for the flow A is set to 3, the border areas ending with the border area of hierarchy 3 are obtained.

In relation to a base station that is not extracted as the one existent in a border area, the base station management apparatus 300 specifies, for example, 0 in the error rate measurement time (306-5') in the flow management table 306, and specifies the normal transmission mode in the operating transmission mode (306-8'). Further, the base station management apparatus 300 transmits the error rate measurement time of 0 and the operating transmission mode of the normal transmission mode to the wireless base station 100. In this example, the wireless base station refers to the base station A (2205). Based on the received data, the base station A updates the error rate measurement time and operating transmission mode in the intra-base station flow management table 106.

For the base station groups classified into the hierarchies 1 to 3, pieces of processing succeeding processing 1003 in the aforesaid first embodiment are executed in order to carry out error rate measuring processing based on a test application protocol. Based on the result of the measurement, multicast data is transmitted in the redundant transmission mode or normal transmission mode. As for the base station group not classified into the hierarchies 1 to 3, since the error rate measurement time is specified as 0, the error rate measuring processing based on the test application protocol is skipped by making a decision under the condition 1100 in FIG. 8. Therefore, the base station group operates in the normal transmission mode.

In the present embodiment, when the error rate measurement time is set to 0, it means that a base station is not regarded as existing in a border area and that an error rate is not measured. Any other appropriate information may be transmitted to each base station in order to notify the base station of the fact whether the base station exists in the border area.

INDUSTRIAL APPLICABILITY

The present invention can be employed in, for example, a radiocommunication system that distributes multicast data. In particular, the present invention can be utilized for a system that distributes data to a predetermined area at a predetermined time instant.

The invention claimed is:

1. A radiocommunication system that comprises a plurality of base stations which communicates with wireless terminals, and a base station management apparatus which is connected to the plurality of base stations and manages the plurality of base stations, and that transmits a multicast flow, of which distribution time instant and distribution area are predetermined, to the wireless terminals, wherein:
the base station management apparatus includes
a first line interface that accommodates connection lines led to the plurality of base stations,
a first control unit that controls the own apparatus, and
a first flow management table in which at least a distribution beginning time instant and an identifier or identifiers of one or a plurality of object-of-distribution base stations existing in the distribution area are stored in association with an identifier of each multicast flow, and
wherein each of the plurality of base stations includes
a second line interface that accommodates connection lines led to the base station management apparatus and a network,
a second control unit that controls the own base station,
a signal processing unit and an antenna for use in communicating with the wireless terminals by radio, and
a second flow management table in which at least the distribution beginning time instant is stored in association with the identifier of each multicast flow;
wherein
the first control unit in the base station management apparatus transmits the identifier of the multicast flow and the distribution beginning time instant, which are stored in the first flow management table, to the base station, which is an object of distribution, according to the identifier of the object-of-distribution base station;
the second control unit in the base station stores in the second flow management table the identifier of the multicast flow and the distribution beginning time instant received via the second interface;
when a current time instant has come to a time instant that is earlier by a predetermined time than the distribution beginning time instant stored in the second flow management table, the second control unit in the base station transmits a protocol or a packet, which is used to measure receiving quality, to the wireless terminals in the communication area of the own base station through the antenna, and measures the receiving qualities of the wireless terminals in the communication area;
if it is found based on the results of the measurements of the receiving qualities that any receiving quality does not satisfy a predetermined criterion, the second control unit in the base station designates a redundant transmission mode in which a plurality of radio resources is assigned to transmission of one multicast flow;
if the receiving quality satisfies the criterion, the second control unit in the base station designates a normal transmission mode in which one radio resource is assigned to transmission of one multicast flow; and
the second control unit in the base station transmits a multicast flow, which is received from the network via the second interface, to the wireless terminals in the designated transmission mode.

2. The radiocommunication system in accordance with claim 1, wherein
a test application protocol for use in measuring receiving quality and returning the result of the measurement to the base station is adopted as the protocol which the base station transmits to the wireless terminals in the communication area.

3. The radiocommunication system in accordance with claim 1, wherein:
the base station management apparatus further includes an adjacent base station management table in which the relationships of adjacency among the base stations are stored;
the first control unit in the base station management apparatus refers to the first flow management table and adjacent base station management table in relation to a desired multicast flow so as to extract an identifier of a base station, which exists in a border area relative to a distribution area of another multicast flow, from among the identifiers of object-of-distribution base stations for the desired multicast flow;
the first control unit in the base station management apparatus notifies each of the object-of-distribution base stations of the fact whether the base station exists in a border area;
the base station in the border area measures the receiving qualities of wireless terminals, and designates the redundant transmission mode or normal transmission mode on the basis of the results of measurements of the receiving qualities; and
the base station other than those existent in the border area does not measure the receiving qualities of wireless terminals but designates the normal transmission mode.

4. The radiocommunication system in accordance with claim 3, wherein:
based on the results of extraction of base stations in the border area, the border area is segmented into border areas of a plurality of hierarchies according to a distance from the border relative to the distribution area of another multicast flow; and
whether the base station measures receiving qualities is determined based on whether the base station exists in the border area of a predetermined hierarchy.

5. The radiocommunication system in accordance with claim 3, wherein:
in the adjacent base station management table, an identifier or identifiers of one or a plurality of base stations adjacent to a base station are stored in association with the identifier of the base station;
the first control unit in the base station management apparatus refers to the first flow management table so as to extract identifiers of first object-of-distribution base stations, which are associated with a desired multicast flow, and an identifier of a second object-of-distribution base station associated with another multicast flow;

the first control unit in the base station management apparatus refers to the adjacent base station management table so as to extract the identifier of the base station, which has the relationship of adjacency to the second object-of-distribution base station, from among the first object-of-distribution base stations, and regards the base stations as the one existent in a border area of a first hierarchy;

the first control unit in the base station management apparatus refers to the adjacent base station management table so as to sequentially extract the identifier of the base station, which has the relationship of adjacency to the base station in the border area of the i-th hierarchy (i denotes an integer ranging from 1 to n−1 where n denotes a predetermined integer), from among the first object-of-distribution base stations, and regards the extracted base station as the one existent in a border area of the i+1-th hierarchy, and thus obtains the base stations in the border areas of the second to n-th hierarchies;

the base stations in the border areas of the first to n-th hierarchies measure the receiving qualities of wireless terminals, and designate the redundant transmission mode or normal transmission mode on the basis of the results of measurements of the receiving qualities; and the base station other than those in the border areas does not measure the receiving qualities of wireless terminals but designates the normal transmission mode.

6. The radiocommunication system according to claim 1, wherein the base station obtains the receiving qualities of the plurality of wireless terminals in the communication area of the own base station, and decides whether the mean value or median value of the obtained receiving qualities satisfies a predetermined criterion.

7. The radiocommunication system according to claim 1, wherein the base station obtains the receiving qualities of the plurality of wireless terminals in the communication area of the own base station, and decides whether the worst value among the obtained receiving qualities satisfies a predetermined criterion.

8. The radiocommunication system according to claim 1, wherein:

the receiving quality is a packet error rate at each wireless terminal;

if the measured packet error rate is larger than a predetermined threshold, the second control unit decides that the receiving quality does not satisfy the criterion; and if the measured packet error rate is equal to or smaller than the threshold, the second control unit decides that the receiving quality satisfies the criterion.

9. The radiocommunication system according to claim 1, wherein:

when the base station is started or restored from a failure, the base station management apparatus and base station verify whether pieces of information in the first flow management table associated with the identifier of the base station match pieces of information on the base station in the second flow management table; and if any piece of information does not square with a counterpart, the piece of information is transmitted to the base station and stored in the second flow management table.

10. The radiocommunication system according to claim 1, wherein if the number of wireless terminals whose receiving qualities are measured is equal to or smaller than a predetermined number of wireless terminals, a multicast flow is transmitted in a previously employed mode.

11. A multicast data distribution method in a radiocommunication system that comprises a plurality of base stations which communicates with wireless terminals, and a base station management apparatus which is connected to the plurality of base stations and manages the plurality of base stations, for transmitting a multicast flow, of which distribution time instant and distribution area are predetermined, to the wireless terminals, including:

the base station management apparatus transmits an identifier of the multicast flow and a distribution beginning time instant, which are stored in a first flow management table in which at least the distribution beginning time instant and an identifier or identifiers of one or a plurality of object-of-distribution base stations existing in the distribution area are stored in association with the identifier of each multicast flow, to the base station which is an object of distribution according to the identifier of the object-of-distribution base station;

the base station stores the identifier of the multicast flow and the distribution beginning time instant received via the second interface in a second flow management table, in which at least the distribution beginning time instant is stored in association with the identifier of each multicast flow, of the base station;

when a current time instant has come to a time instant that is earlier by a predetermined time than the distribution beginning time instant stored in the second flow management table, the second control unit in the base station transmits a protocol or a packet, which is used to measure receiving quality, to the wireless terminals in the communication area of the own base station through the antenna, and measures the receiving qualities of the wireless terminals in the communication area;

if it is found based on the results of the measurements of the receiving qualities that any receiving quality does not satisfy a predetermined criterion, the second control unit in the base station designates a redundant transmission mode in which a plurality of radio resources is assigned to transmission of one multicast flow;

if the receiving quality satisfies the criterion, the second control unit in the base station designates a normal transmission mode in which one radio resource is assigned to transmission of one multicast flow; and the second control unit in the base station transmits a multicast flow, which is received from the network, to the wireless terminals in the designated transmission mode.

12. The multicast data distribution method in accordance with claim 11, wherein a test application protocol for use in measuring receiving quality and returning the result of the measurement to the base station is adopted as the protocol which the base station transmits to the wireless terminals in the communication area.

13. The multicast data distribution method in accordance with claim 11, wherein:

the base station management apparatus further includes;

the base station management apparatus refers to the first flow management table and an adjacent base station management table, in which the relationships of adjacency among the base stations are stored, in relation to a desired multicast flow so as to extract an identifier of a base station, which exists in a border area relative to a distribution area of another multicast flow, from among the identifiers of object-of-distribution base stations for the desired multicast flow;

the first control unit in the base station management apparatus notifies each of the object-of-distribution base stations of the fact whether the base station exists in a border area;

the base station in the border area measures the receiving qualities of wireless terminals, and designates the redundant transmission mode or normal transmission mode on the basis of the results of measurements of the receiving qualities; and the base station other than those existent in the border area does not measure the receiving qualities of wireless terminals but designates the normal transmission mode.

14. The multicast data distribution method in accordance with claim 13, wherein:

based on the results of extraction of base stations in the border area, the border area is segmented into border areas of a plurality of hierarchies according to a distance from the border relative to the distribution area of another multicast flow; and whether the base station measures receiving qualities is determined based on whether the base station exists in the border area of a predetermined hierarchy.

15. The multicast data distribution method in accordance with claim 13, wherein:

in the adjacent base station management table, an identifier or identifiers of one or a plurality of base stations adjacent to a base station are stored in association with the identifier of the base station;

the base station management apparatus refers to the first flow management table so as to extract identifiers of first object-of-distribution base stations, which are associated with a desired multicast flow, and an identifier of a second object-of-distribution base station associated with another multicast flow;

the first control unit in the base station management apparatus refers to the adjacent base station management table so as to extract the identifier of the base station, which has the relationship of adjacency to the second object-of-distribution base station, from among the first object-of-distribution base stations, and regards the base stations as the one existent in a border area of a first hierarchy;

the first control unit in the base station management apparatus refers to the adjacent base station management table so as to sequentially extract the identifier of the base station, which has the relationship of adjacency to the base station in the border area of the i-th hierarchy (i denotes an integer ranging from 1 to n−1 where n denotes a predetermined integer), from among the first object-of-distribution base stations, and regards the extracted base station as the one existent in a border area of the i+1-th hierarchy, and thus obtains the base stations in the border areas of the second to n-th hierarchies;

the base stations in the border areas of the first to n-th hierarchies measure the receiving qualities of wireless terminals, and designate the redundant transmission mode or normal transmission mode on the basis of the results of measurements of the receiving qualities; and the base station other than those in the border areas does not measure the receiving qualities of wireless terminals but designates the normal transmission mode.

16. The multicast data distribution method according to claim 11, wherein the base station obtains the receiving qualities of the plurality of wireless terminals in the communication area of the own base station, and decides whether the mean value or median value of the obtained receiving qualities satisfies a predetermined criterion.

17. The multicast data distribution method according to claim 11, wherein the base station obtains the receiving qualities of the plurality of wireless terminals in the communication area of the own base station, and decides whether the worst value among the obtained receiving qualities satisfies a predetermined criterion.

18. The multicast data distribution method according to claim 11, wherein:

the receiving quality is a packet error rate at each wireless terminal;

if the measured packet error rate is larger than a predetermined threshold, the base station decides that the receiving quality does not satisfy the criterion; and if the measured packet error rate is equal to or smaller than the threshold, the second control unit decides that the receiving quality satisfies the criterion.

19. The multicast data distribution method according to claim 11, wherein:

when the base station is started or restored from a failure, the base station management apparatus and base station verify whether pieces of information in the first flow management table associated with the identifier of the base station match pieces of information on the base station in the second flow management table; and if any piece of information does not square with a counterpart, the piece of information is transmitted to the base station and stored in the second flow management table.

20. The multicast data distribution method according to claim 11, wherein if the number of wireless terminals whose receiving qualities are measured is equal to or smaller than a predetermined number of wireless terminals, a multicast flow is transmitted in a previously employed mode.

* * * * *